United States Patent [19]
Thornton

[11] Patent Number: 6,097,792
[45] Date of Patent: *Aug. 1, 2000

[54] INTERACTIVE METHOD AND APPARATUS FOR THE GENERATION OF LEADS

[75] Inventor: James T. Thornton, Tarpon Springs, Fla.

[73] Assignee: TeleDynamics Group, Inc., Clearwater, Fla.

[*] Notice: This patent is subject to a terminal disclaimer.

[21] Appl. No.: 09/266,934

[22] Filed: Mar. 12, 1999

Related U.S. Application Data

[62] Division of application No. 08/675,274, Jul. 1, 1996, Pat. No. 5,883,940.

[51] Int. Cl.⁷ .................................................. H04M 1/64
[52] U.S. Cl. ......................... 379/88.2; 379/111; 379/127
[58] Field of Search .................................. 379/67.01, 69, 379/88.16, 88.17, 88.19, 88.2, 88.22, 88.27, 92.01, 92.02, 92.03, 93.12, 93.13, 111, 112, 113, 127, 142, 201

[56] References Cited

U.S. PATENT DOCUMENTS

| | | | |
|---|---|---|---|
| 4,320,256 | 3/1982 | Freeman | 379/67 |
| 4,757,267 | 7/1988 | Riskin | 379/113 |
| 4,908,520 | 3/1990 | Tai | 364/401 |
| 4,922,520 | 5/1990 | Bernard et al. | 379/88 |
| 4,989,233 | 1/1991 | Schakowsky et al. | 379/92 |
| 5,163,087 | 11/1992 | Kaplan | 379/94 |
| 5,255,183 | 10/1993 | Katz | 364/406 |
| 5,282,243 | 1/1994 | Dabbaghi et al. | 379/201 |
| 5,311,507 | 5/1994 | Bedrossian | 379/204 |
| 5,369,571 | 11/1994 | Metts | 364/401 |
| 5,619,558 | 4/1997 | Jheeta | 379/90 |
| 5,774,534 | 6/1998 | Mayer | 379/142 |

*Primary Examiner*—Scott L. Weaver
*Attorney, Agent, or Firm*—Liniak, Berenato, Longacre & White

[57] ABSTRACT

An interactive method and apparatus for the generation of leads is provided that stores a plurality of prerecorded messages. The system accepts user's phone calls and captures the user's phone number, combines it with additional information and tracks users transactions with the system and subsequently transfers the combined information in the form of a sales lead to a prospective seller immediately upon termination of the phone call or beginning prior thereto.

5 Claims, 9 Drawing Sheets

Microfiche Appendix Included
(8 Microfiche, 693 Pages)

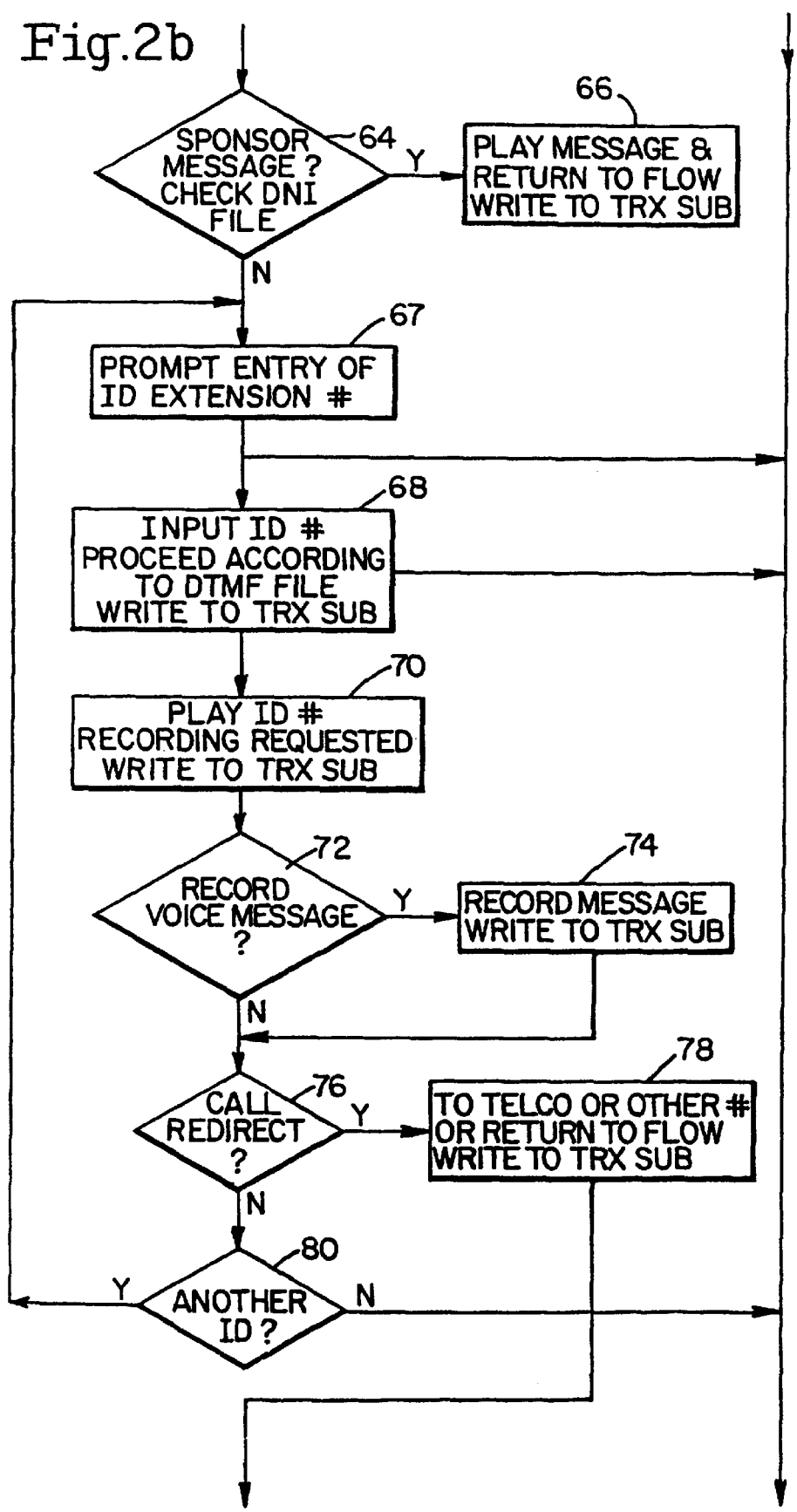

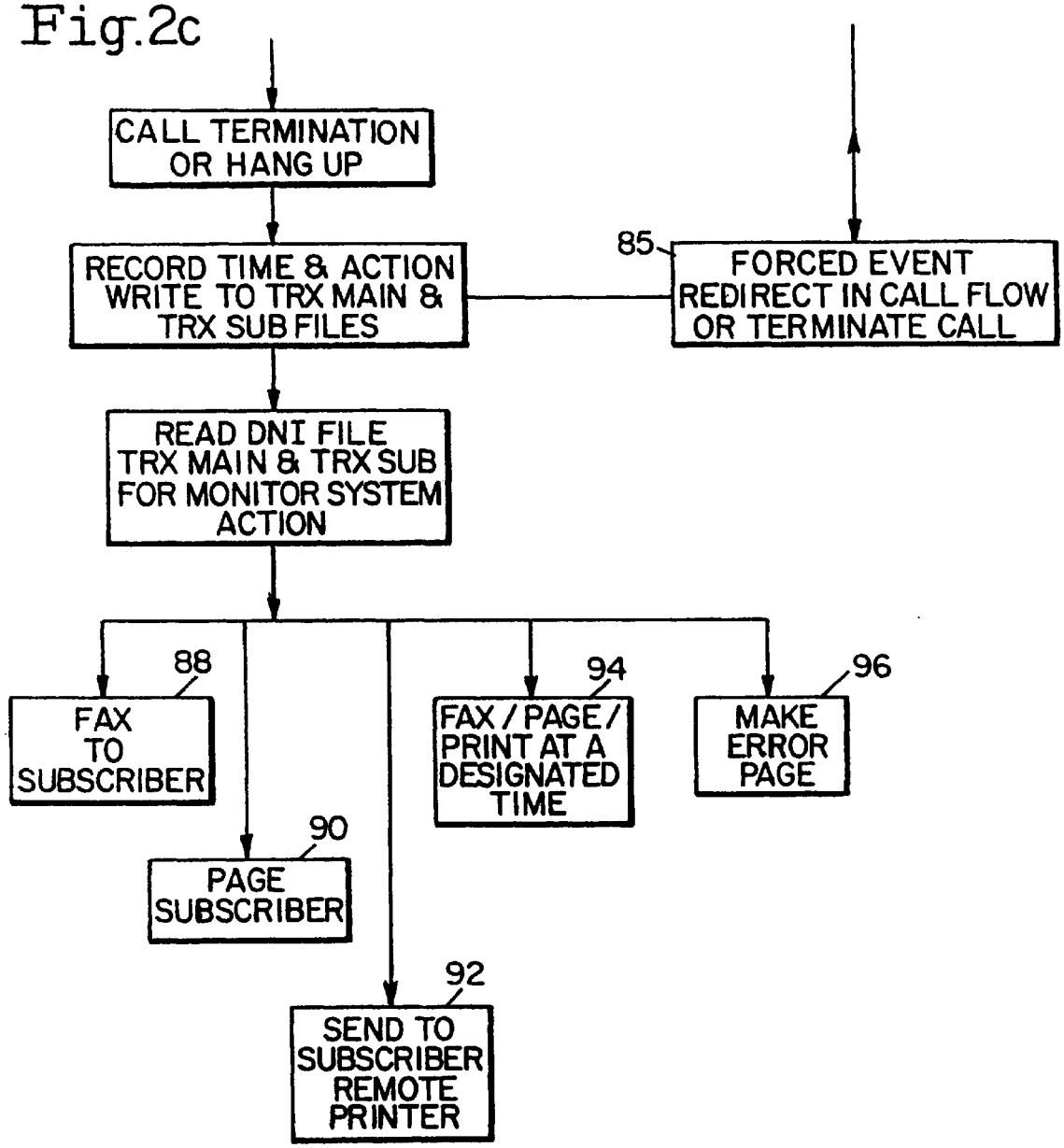

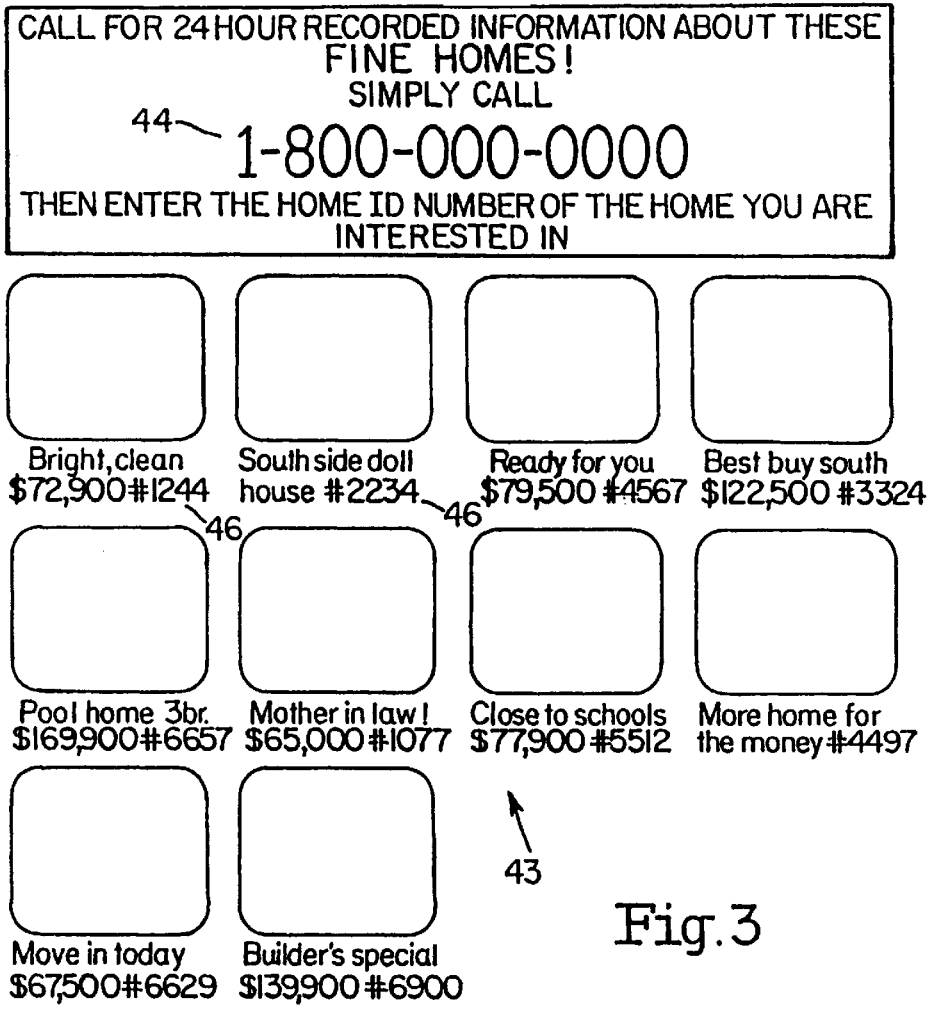

```
+------------------------------------[ DNI File Update ]----------------------------
-----+
|DNI        : (800) 888-8888     Max Messages :002:        Phone Calls
:00006243
|Group      :8818:               Max Call Duration :0300:
|
|Station    :8818
|
|Description :Home-Tel Demo Number
|
|Mode       :00:   00=Play, 01=Record, 02=Remote Play, 03=Remote Record
|                  78=Seat this Caller
|                  80=Get PIN#, 81=Play
Pin#, 87=Reduce1, 88=Reduce2, 89=Reduce3
|                  90=Play Month, 91=Play Lucky Number, 92=Play Pick 3
|                  93=Play Lucky 6, 94=Play Day, 95=Get Month, 96=Get Day
|                  97=Play Forcast, 98=Get Lucky Number, 99=Redirect
|First File  :8818000   :       First file played, recorded, ...
|
|Max DTMFS  :04:   Maximum Number of DTMF digits to continue
|
|Term DTMFS :#*        :        Pressing any of these DTMFS will terminate
|
|Max Replays :0:   Maximum Number of replays of this message
|
|Max Record :000:  Maximum Record time allowed in seconds
|
|Forced File :1000             : Force DTMFS to link to next file
|
|Wait Time   :03:  Seconds to wait for remainder of DTMFS
|
|Invalid DTMFS :02: Max number of invalid DTMFS before termination
|
|DTMF Error  :DTMFERR.VAP : Chain to this on error
|
|Ending DTMFS :               : Chain to this on Term of call
|
|Replay      :  : DTMF to press to replay this message
|
|Rate Code   :  :  Rate Code for this message
|
|Category    :DEMO: Category Code for this message
|
+--------------------------------------------------------------[F6 - Next] [F10 -
Delete ]+
```

Fig. 5a

```
+------------------------------[ DTMF File Update ]------------------------------+
| DTMFS        : 1000
|
| Group        :8818:       Next Group          :8818:
|
| Station      :8818:       Count message       :000:
|
| Description  :Hometel Demo Message
|
| Mode         :00:   00=Play, 01=Record, 02=Remote Play, 03=Remote Record
|                     76=Trunk Group, 77=Play Hold #, 78=Seat Caller
|                     79=Redirect on Key Pressed, 99=Redirect
|                     75=Hang up on caller, 74=Say ANI
|                     71=Say Yesterday's Calls, 72=Say Today's Calls
|
| Broker #     :5168: Last 4 Digits of Broker's SS#
|
| First File   :88181000   :    First file played, recorded, ...
|
| Max DTMFS    :04:   Maximum Number of DTMF digits to continue
|
| Term DTMFS   :#     :     Pressing any of these DTMFS will terminate
|
| Max Replays  :2:    Maximum Number of replays of this message
|
| Max Record   :000:  Maximum Record time allowed in seconds
|
| Forced File  :ENTER          : Force DTMFS to link to next file
|
| Wait Time    :03:   Seconds to wait for remainder of DTMFS
|
| Invalid DTMFS :02:  Max number of invalid DTMFS before termination
|
| DTMF Error   :DTMFERR.VAP  : Chain to this on error
|
| Ending DTMFS :              : Chain to this on Term of call
|
| Replay       :   :  DTMF to press to replay this message
|
| Category     :DEMO:  Category Code for this message
|
| Sponsor      :   : Sponsor of this message
|
+[F2-Add]------------------------------------------------------------[F10 -Delete
Record]+
```

Fig. 5b

[Another Trans or Tel Lead #001149] ~98
Dialed #(800)777-7777 ~100
MONTY'S AUTO SALES ~102

Call duration 00:08 — 104
May 02, 1997 05:37:54 PM
   106      108
JOHN DOE —110
1234 Main st. —112
Clearwater FL. 34666
(813) 555-5555 —114
ID #'s 1000, —116

Sales person: _____
Date called: __/__/__
Time called: __:__:__
Reponse:

Call Activity Report from 0/ 0/96 to 0/ 0/96                    /117
Report Date: 0/ 0/96  Time: 00:48:02
Toll free #(800)888-8888 —119    Broker#:0000 —121

| Telephone /115 | Call Date | Call Time | ID# /111 | Call Duration /125 | ID# Duration /123 |
|---|---|---|---|---|---|
| Hartford, CT<br>(860)555-1234 | 0/ 0/96 | 14:25:22 | 1000<br>\118 | 00:01:50 | 1000=00:01:10 |
| (310)555-6789<br>Bloomie's Nursery<br>5555 Central St.<br>Tampa, FL. 33333 | 0/ 0/96 | 16:58:23 | 1001,<br>1002,<br>120 /1003 | 00:04:20 | 1001=00:00:50<br>1002=00:01:13<br>1003=00:01:41 |
| (310)555-3456<br>Johnathan Doe<br>1234 Anywhere St.<br>Orlando, FL. 34444 | 0/ 0/96 | 20:45:57 | 1004<br>122/ | 00:01:10 | 1004=00:00:58 |
| (310)555-9876<br>Janice Brown<br>1111 South 15th St.<br>Palm Harbor, FL. 36666 | 0/ 0/96 | 18:36:14 | 1005,<br>1006,<br>124 /1007 | 00:03:50 | 1005=00:00:56<br>1006=00:01:20<br>1007=00:01:07 |

Fig. 7

Currently Listed Home ID#s for 888-8888 as of 0\0\96

| Home ID | Last Update | Home ID | Last Update | Home ID | Last Update | Home ID | Last Update | Home ID | Last Update |
|---|---|---|---|---|---|---|---|---|---|
| 5259 | 03-04-96 | 6021 | 08-18-95 | 7002 | 09-21-95 | 8005 | 10-09-95 | 8062 | 03-26-96 |
| 5265 | 04-01-96 | 6022 | 08-18-95 | 7003 | 09-21-95 | 8006 | 10-09-95 | 8069 | 02-22-96 |
| 5266 | 04-01-96 | 6023 | 09-14-95 | 7004 | 11-03-95 | 8007 | 10-11-95 | 8070 | 02-02-96 |
| 5267 | 04-01-96 | 6024 | 08-18-95 | 7005 | 09-21-95 | 8008 | 11-17-95 | 8071 | 02-02-96 |
| 5268 | 04-01-96 | 6025 | 01-23-96 | 7006 | 09-21-95 | 8009 | 03-01-96 | 8075 | 11-24-95 |
| 5269 | 04-05-96 | 6026 | 01-27-96 | 7007 | 09-21-95 | 8010 | 10-10-95 | 8076 | 11-22-95 |
| 5270 | 04-01-96 | 6027 | 09-01-95 | 7008 | 11-03-95 | 8011 | 02-24-96 | 8077 | 11-14-95 |
| 5271 | 04-01-96 | 6028 | 02-11-96 | 7009 | 09-21-95 | 8012 | 02-24-96 | 8078 | 11-14-95 |
| 5272 | 04-01-96 | 6029 | 08-18-95 | 7010 | 10-18-95 | 8013 | 04-05-96 | 8079 | 11-14-95 |
| 5273 | 04-01-96 | 6030 | 08-18-95 | 7011 | 08-22-95 | 8014 | 02-29-96 | 8080 | 11-14-95 |
| 5274 | 04-01-96 | 6031 | 08-18-95 | 7012 | 08-22-95 | 8015 | 04-05-96 | 8081 | 01-17-96 |
| 5275 | 04-01-96 | 6032 | 08-18-95 | 7013 | 08-22-95 | 8016 | 11-30-95 | 8082 | 01-17-96 |
| 5276 | 04-01-96 | 6033 | 08-30-95 | 7014 | 08-29-95 | 8017 | 12-07-95 | 8083 | 01-17-96 |
| 5277 | 04-01-96 | 6034 | 09-08-95 | 7015 | 08-22-95 | 8018 | 01-17-96 | 8084 | 01-17-96 |
| 5278 | 04-01-96 | 6035 | 09-18-95 | 7016 | 08-24-95 | 8019 | 12-07-95 | 8085 | 01-17-96 |
| 5279 | 04-09-96 | 6036 | 03-27-96 | 7017 | 08-22-95 | 8020 | 08-26-95 | 8091 | 02-28-96 |
| 5280 | 04-09-96 | 6037 | 11-02-95 | 7018 | 09-01-95 | 8021 | 04-08-96 | 8092 | 01-23-96 |
| 5281 | 04-09-96 | 6038 | 02-21-96 | 7019 | 08-22-95 | 8022 | 08-21-95 | 8093 | 02-28-96 |
| 5282 | 04-09-96 | 6338 | 12-19-95 | 7020 | 09-06-95 | 8023 | 03-28-96 | 8094 | 01-23-96 |
| 5283 | 04-09-96 | 6500 | 04-15-96 | 7021 | 08-22-95 | 8024 | 03-28-96 | 8095 | 03-01-96 |
| 5284 | 04-09-96 | 6501 | 03-08-96 | 7022 | 08-22-95 | 8025 | 08-26-95 | 8096 | 03-01-96 |
| 5285 | 04-09-96 | 6502 | 04-25-96 | 7023 | 08-22-95 | 8026 | 02-06-96 | 8097 | 02-02-96 |
| 5286 | 04-17-96 | 6503 | 03-27-96 | 7024 | 08-24-95 | 8027 | 03-28-96 | 8098 | 03-01-96 |
| 5287 | 04-17-96 | 6504 | 03-26-96 | 7025 | 11-30-95 | 8028 | 09-12-95 | 8099 | 02-29-96 |
| 5400 | 03-14-96 | 6505 | 04-15-96 | 7026 | 09-21-95 | 8029 | 09-08-95 | 8400 | 02-22-96 |
| 5401 | 03-29-96 | 6506 | 03-26-96 | 7027 | 11-30-95 | 8030 | 02-06-96 | 8401 | 02-22-96 |
| 5402 | 03-29-96 | 6508 | 04-17-96 | 7028 | 09-21-95 | 8031 | 02-12-96 | 8402 | 02-22-96 |
| 5403 | 03-20-96 | 6509 | 04-29-96 | 7029 | 11-03-95 | 8032 | 12-04-95 | 8403 | 02-22-96 |
| 5404 | 03-13-96 | 6535 | 04-25-96 | 7030 | 09-21-95 | 8033 | 10-12-95 | 8404 | 02-22-96 |
| 5405 | 03-13-96 | 6536 | 04-25-96 | 7031 | 11-03-95 | 8034 | 08-21-95 | 8405 | 02-27-96 |
| 5406 | 03-13-96 | 6537 | 04-25-96 | 7032 | 09-22-95 | 8035 | 08-21-95 | 8406 | 02-27-96 |
| 5407 | 03-14-96 | 6538 | 04-25-96 | 7033 | 11-30-95 | 8036 | 08-21-95 | 8407 | 04-01-96 |
| 5408 | 03-13-96 | 6600 | 03-05-96 | 7034 | 11-30-95 | 8037 | 08-21-95 | 8450 | 04-25-96 |
| 5409 | 03-19-96 | 6601 | 03-29-96 | 7035 | 11-30-95 | 8038 | 08-21-95 | 8451 | 03-07-96 |
| 5410 | 03-18-96 | 6602 | 03-05-96 | 7036 | 08-22-95 | 8039 | 08-21-95 | 8452 | 03-07-96 |
| 5411 | 03-18-96 | 6603 | 03-29-96 | 7037 | 08-22-95 | 8040 | 08-21-95 | 8453 | 03-07-96 |
| 5412 | 03-18-96 | 6604 | 03-29-96 | 7038 | 08-22-95 | 8041 | 08-21-95 | 8454 | 03-07-96 |
| 5413 | 03-18-96 | 6605 | 03-05-96 | 7039 | 08-22-95 | 8042 | 04-17-96 | 8455 | 03-07-96 |
| 5414 | 03-20-96 | 6606 | 03-29-96 | 7040 | 08-22-95 | 8043 | 04-17-96 | 8456 | 03-07-96 |
| 6000 | 08-26-95 | 6607 | 03-29-96 | 7041 | 08-22-95 | 8044 | 04-17-96 | 8457 | 03-07-96 |
| 6007 | 08-24-95 | 6610 | 03-08-96 | 7042 | 08-24-95 | 8045 | 04-17-96 | 8458 | 03-22-96 |
| 6008 | 08-24-95 | 6611 | 03-08-96 | 7043 | 08-22-95 | 8046 | 04-17-96 | 8459 | 03-29-96 |
| 6010 | 01-05-96 | 6612 | 03-08-96 | 7044 | 08-22-95 | 8047 | 08-26-95 | 8462 | 03-11-96 |
| 6011 | 08-18-95 | 6613 | 03-08-96 | 7045 | 08-22-95 | 8048 | 04-17-96 | 8463 | 03-11-96 |
| 6012 | 08-18-95 | 6614 | 03-08-96 | 7046 | 08-22-95 | 8049 | 08-21-95 | 8464 | 03-11-96 |
| 6013 | 08-18-95 | 6615 | 03-08-96 | 7047 | 08-22-95 | 8052 | 11-30-95 | 8466 | 03-11-96 |
| 6014 | 08-18-95 | 6616 | 03-08-96 | 7048 | 08-22-95 | 8053 | 11-30-95 | 8467 | 03-11-96 |
| 6015 | 08-18-95 | 6617 | 03-08-96 | 7049 | 08-22-95 | 8054 | 03-08-96 | 8468 | 03-12-96 |
| 6016 | 08-18-95 | 6618 | 03-05-96 | 8000 | 10-26-95 | 8055 | 02-22-96 | 8469 | 03-11-96 |
| 6017 | 08-18-95 | 6619 | 03-05-96 | 8001 | 04-01-96 | 8057 | 02-28-96 | 8470 | 04-22-96 |
| 6018 | 08-18-95 | 6620 | 03-05-96 | 8002 | 08-29-95 | 8058 | 02-28-96 | 8500 | 02-24-96 |
| 6019 | 08-18-95 | 7000 | 11-03-95 | 8003 | 08-29-95 | 8059 | 03-26-96 | 8501 | 02-24-96 |
| 6020 | 08-18-95 | 7001 | 09-21-95 | 8004 | 12-12-95 | 8060 | 03-26-96 | 8502 | 02-24-96 |

Fig. 8

INTERACTIVE METHOD AND APPARATUS FOR THE GENERATION OF LEADS

This application is a divisional of U.S. Ser. No. 08/675,274, filed on Jul. 1, 1996, now U.S. Pat. No. 5,883,940.

REFERENCE TO MICROFICHE APPENDIX

A microfiche appendix of 8 microfiche and 693 total frames containing the computer source code program listings of an exemplary computer program described in this application has been submitted as a part of this application and is incorporated herein by reference. The computer program consists of the major, the Interactive Voice Response (IVR) program and the monitor system program. The IVR program contains of the following files:

| | File Name | |
|---|---|---|
| ANENTRY.CPP | ANIS.CPP | BDR.CPP |
| BDENTRY.CPP | BRKCHG.CPP | CATEGORY.CPP |
| DNI.CPP | DNIENTRY.CPP | DNILIST.CPP |
| DTCOPY.CPP | DTENTER.CPP | DTENTRY.CPP |
| DTERR.CPP | DTGROUP.CPP | DTMAKER.CPP |
| DTMF.CPP | DTTEST.CPP | DTWAIT.CPP |
| EVQ.CPP | FASTRAX.CPP | GROUP.CPP |
| LANIER.CPP | MAKEDNI.CPP | NSICOMM.CPP |
| PAGER.CPP | RATE.CPP | REQDBF.CPP |
| REQTRX.CPP | DNIMAX.CPP | REQUEST.CPP |
| REROUTE.CPP | RESENTRY.CPP | RESPOND.CPP |
| ROUENTRY.CPP | SCENTRY.CPP | SEATING.CPP |
| SPONSOR.CPP | STATION.CPP | SYSCON.CPP |
| SYSCON1.CPP | SYSCON2.CPP | TRXDBF.CPP |
| TRXFROM.CPP | TRXN.CPP | TRXMAIN.CPP |
| TRXSFROM.CPP | TRXSUB.CPP | UPLOAD.CPP |
| IVR.CPP | ANIS.HPP | BDR.HPP |
| CATEGORY.HPP | DTMF.HPP | NSICOMM.HPP |
| FASTRAX.HPP | GROUP.HPP | IVR.HPP |
| DNI.HPP | LANIER.HPP | PAGER.HPP |
| RATE.HPP | REQTRX.HPP | REQUEST.HPP |
| REROUTE.HPP | SDL.HPP | SEATING.HPP |
| SPONSOR.HPP | STATION.HPP | SYSCON.HPP |
| TRXMAIN.HPP | UPLOAD.HPP | TRXSUB.HPP |
| EVQ.HPP | | |

The Monitor system contains the following files:

| | File Name | |
|---|---|---|
| APC.CPP | BROWSER.CPP | BTRIEVE.CPP |
| CODEPLUS.CPP | COMM.CPP | CRITICAL.CPP |
| DATABASE.CPP | DISKBUFF.CPP | DISP.CPP |
| DISPLAY.CPP | ERRLOG.CPP | FPFILE.CPP |
| ISDNPKT.CPP | KBDIO.CPP | MEMBUFF.CPP |
| MODEM.CPP | SCRIO.CPP | STDFILE.CPP |
| TAP.CPP | TIMER.CPP | TWINDOW.CPP |
| UTILITY.CPP | FILES.C | FILES2.C |
| UTILS.C | ARCUST.CPP | ARIMPORT.CPP |
| BKCPY.CPP | IMPORT.CPP | ATOTEST.CPP |
| BANK.CPP | BRENTRY.CPP | PTICKET.CPP |
| BROKER.CPP | CODES.CPP | CSR.CPP |
| EMPLOYEE.CPP | HOMEID.CPP | HTCONST.CPP |
| VEHICLE.CPP | VEHENTRY.CPP | HTEL.CPP |
| HTENTRY.CPP | INDEXER.CPP | INVMAKE.CPP |
| JTDIR.CPP | LENDER.CPP | MAKE0296.CPP |
| MAILBOX.CPP | MONITOR.CPP | NDC.CPP |
| NDCFORM.CPP | NDCHIST.CPP | NDCMAKE.CPP |
| PAGER.CPP | PAGETRX.CPP | PHONELOG.CPP |
| RATES.CPP | RAWDATA.CPP | RAWID.CPP |
| RAWTEST.CPP | REAGENT.CPP | REPT.CPP |
| RMATCH.CPP | SALESREP.CPP | SELENTRY.CPP |
| SELPHONE.CPP | SIC.CPP | SICENTRY.CPP |

-continued

| | File Name | |
|---|---|---|
| TESTER3.CPP | TESTPG.CPP | TRGFORM.CPP |
| TRGMAKE.CPP | TRXDBF.CPP | TRXMAIN.CPP |
| TRXSDBF.CPP | UPLDBF.CPP | UPLOAD.CPP |
| USAPHONE.CPP | | |

The titles of the program files contained in the IVR and Monitor System program listings correspond to those referenced in the flow diagrams and the detailed description of the invention.

BACKGROUND OF THE INVENTION

The present invention relates to an interactive method and apparatus for generating leads for the sales of products or services and/or for conducting real time polling from incoming telephone calls. More particularly, this invention relates to an interactive method and apparatus for generating sales leads or conducting real time polling that can store product or service information under a plurality of individual identification numbers in a memory accessible to potential customers by phone, instantly capture and record the phone number dialed and the phone numbers associated with each incoming call, conduct a search using the caller's phone number to obtain their name and address, track all transactions entered or forced during each call and monitor the time and duration of the call and other call events. The present invention then provides an instantaneous detailed sales lead with the above-listed information to a prospective seller in the form of a report printed on a subscribers remote printer, a fax transmission, a voice or alphanumeric page during or immediately upon completion of the potential buyer's phone call.

Sales of goods and services have been occurring for centuries. For an equally long time sellers have consistently faced the problem of attempting to attract customers for their offerings. When it comes to large ticket items, these problems tend to multiply. Unlike low cost items that may be purchased on a daily or weekly basis, items such as automobiles and homes are usually purchased once over a period of sometimes many years or a lifetime.

As a result, much more deliberation usually goes into the decision to make such purchases and a great deal of information is often required by the prospective purchaser. As can be appreciated, the potential purchasers of such goods are only "in the market" for information and products for a certain finite period of time. If a seller does not reach and influence a potential customer during this critical window of opportunity, it may be years before the purchaser again becomes a potential prospect for the seller.

Various marketing techniques have been used by sellers to try to target and entice prospective buyers during the critical window of buying opportunity with limited success. Cold generic letters or mass mailings have often been viewed either as junk mail or impersonal. They also waste marketing resources since they are frequently sent to individuals that are not even in the market for the particular product advertised. The same can be said of various giveaway sweepstakes or other promotional efforts. Such promotions spend precious marketing dollars over the entire lives of potential consumers even though they are not at all interested in making such purchases the vast majority of the time. These efforts therefore fail to successfully concentrate these limited resources on ready prospects.

Mailed promotions that require customers to take some affirmative action, such as coming to the seller's place of business or mailing back a card, usually screen out sizable portions of potential customers. Potential customers frequently do not get around to completing these acts or are fearful that such actions will generate undue pressure from sales people to purchase. Tracking the effectiveness of such promotional efforts is also difficult since customers may ultimately appear in person, yet not carry out the acts requested or indicate that the promotional material ultimately was the reason for their interest or visit.

Telemarketing or cold calling has also been utilized. However, the extended deliberation usually associated with the purchase of a large ticket item, this technique is usually ineffective. Beyond that, if the purchaser is not in the market for the item being offered for sale in the phone call future damage could be done. By the time the customer is ultimately in the market to purchase such items, a prior unwelcome intrusion etched in his memory may actually drive a potential buyer away from that seller.

Print and newspaper advertising has also frequently been used to generate potential sales leads. Although these promotional forms have proven to be satisfactory, they have also exhibited a number of drawbacks. To begin with, such forms of advertising are usually extremely expensive. They also do not specifically target proven potential customers, but rather are directed across an entire reading or viewing audience.

Such advertising has at times been coupled with market or survey research to attempt to place ads in publications, broadcasts or other places that are specifically viewed by those that are more likely to make the purchases of the advertised sellers products. For example, research might show that those between certain ages are more likely to make certain purchases. Advertisements would then be concentrated in publications or broadcasts that are likely to attract that target group. Such research, however, has a long time lag, frequently is expensive and even when done well still tends to be inaccurate. For example, just because one in their 30's might be more likely to buy a home or automobile, they are by no means continuously in the market for such items just because they are of a certain age.

Due to the cost of such advertising, the ads themselves often must be short in length or time. It is therefore particularly difficult in the case of homes or automobiles to convey a great deal of information about any one item. This is compounded by the fact that such advertisements must often feature a variety of items in any given segment. Due to the increased abilities of currently available telecommunications and computer systems, the potential purchasing public has come to frequently desire a level of information greater than that which is frequently communicated in print and broadcast advertising. The consuming public has also become increasingly intolerant of waiting for a real estate agent or other sales person to return a phone call for basic product information.

Various efforts have been undertaken in an effort to enhance such advertising. A telephone number can be provided in the advertisement to direct the caller to the ability to obtain additional information concerning the item. If the phone number is that of the seller, it is unlikely that this will generate more than a few sales leads since it requires the prospective buyer to interact directly with the seller's representative to obtain even the most basic of information.

It has been proven more successful to communicate additional information in an attempt to interest a prospective buyer by providing dedicated telephone numbers that connect a caller to prerecorded messages. In this manner, the prospective customer can gain additional information about his prospective purchase at his leisure and in the privacy of his own home. The prospective customer does not have to initiate direct contact with the seller until he has obtained this additional information and progressed significantly further in his decision making process.

Although television or newspaper ads that list phone numbers to access prerecorded information about the items they advertise afford significant additional information to the potential prospect, they do nothing to communicate the interest of the prospective purchaser back to the seller until and unless two things happen. The prospective purchaser must first contact the seller and then secondly the seller must illicit the fact that the prospective purchaser's interest was generated or heightened by the advertisement listing the phone number for the dedicated recording and listening to the recording itself. Therefore, although these systems can generate additional interest, the interest or potential sales leads that they represent cannot be readily tracked or used by sellers.

In the average home or car buying situation, there is a very small window of opportunity for a seller to attempt to find a ready prospect and convert that interest into a sale of their particular item. Missing this window of opportunity by a day or even a number of hours can often be the difference between making a sale or not. It therefore is not just the generation of leads, but the timely and precise communication of such leads that is most important when it comes to these purchases.

As a result of the shortcomings of the known systems set forth above, a number of other systems have been developed. One such known system is marketed under the name "DIAL A HOME" by Info-Quest, Inc. of Lawrenceville, Ga. In this system, 24 hour real estate information is provided by allowing an agent to record a 30 or 40 second message describing the amenities of listed properties. Prospective buyers may access the listing information by entering an advertising code for a particular listing. The prospective buyers can therefore listen to additional information provided on the recording and can be forwarded directly to a listing agent or their office, or request that additional information on the property be sent to them. While the call is connected, the system utilizes Caller ID to capture the telephone number of the prospective buyer. This telephone number is then stored in a memory for dial in access at a later time by the real estate listing agent.

Although an improvement over several known systems, the DIAL-A-HOME system still poses drawbacks. The lead generation aspect of the system depends upon Caller ID, which is known to be inaccurate about 2–6% of the time, can be selectively blocked by the caller and provides only the phone number of the caller without additional information. This leaves the real estate agent without the ability to either personalize their subsequent sales approach, to know whether the call originated from a place of business or residence, or screen out wrong numbers or prank calls. In addition, this system does not convey important details of the phone call concerning the time of day or duration of the call. The system likewise does not permit real time updating of the recorded messages, nor does it have the ability to immediately, either during or upon termination of the call, fax or otherwise communicate via phone lines relevant lead information to the seller.

It is therefore apparent that the need exists in the art for an improved interactive lead generation system that provides a wider variety of benefits and options to capture and utilize sales leads that begin with the customer's phone call.

SUMMARY OF THE INVENTION

Accordingly, it is an object of the present invention to provide an interactive method and apparatus of generating leads that provides sales leads to the seller, either during or immediately upon termination of the phone call made by the prospective buyer to access information stored in the memory of the lead generation system.

It is another object of the present invention to provide these immediate sales leads to the seller without necessitating any further action by the seller.

It is still another object of the present invention to provide an interactive method and apparatus for the generation of leads that provides immediate sales leads to the seller via fax, voice or other page or a printed document on the seller's remote printer.

It is still a further object of the invention to provide an interactive method and apparatus for the generation of leads that utilizes automatic number identification (ANI) rather than caller ID.

It is an additional object of the present invention to provide an interactive method and apparatus for the generation of leads that captures the caller's telephone number as a basis to perform one or more database searches to provide additional information about the caller.

It is a further object of the present invention to provide an interactive method and apparatus for the generation of leads that tracks and records all incoming calls, all digits pressed by the caller on their telephone and every event forced by the system into transaction files.

It is yet another object of the present invention to provide an interactive method and apparatus for the generation of leads that includes significant additional information with the sales leads in addition to the telephone number dialed by the caller and the caller's own telephone number.

It is yet a further object of the invention to provide an interactive method and apparatus for the generation of leads wherein the additional information provided with the sales lead may include the date and time of the call, the duration of the phone call, information from the transaction files or the caller's name and address.

It is yet a still further object of the present invention to provide an interactive method and apparatus for the generation of leads that is telephone activated and provides for caller control, call redirect and call security.

It is a still further object of the present invention to provide an interactive method and apparatus for the generation of leads that allows satellite downloading of audio files.

It is yet another further object of the present invention to provide an interactive method and apparatus for the generation of leads that allows audio uploading from remote sites and updating of the voice recorded messages in real-time without having to disable the recording from being accessed during the updating.

It is a still further object of the present invention to provide an interactive method and apparatus for the generation of leads that permits a caller to record a message and combine it with the additional information captured by the system concerning the phone call and provided the message immediately to a seller.

It is a still further object of the present invention to provide an interactive method and apparatus for the generation of leads that can be utilized as a real time polling or survey system.

These and other objects of the present invention are satisfied by a user interactive method for the generation of leads comprising the steps of storing a plurality of recorded messages in a memory, assigning a different identifier to each message stored in the memory, providing an incoming telephone line that can access certain of the messages stored in the memory through a processor, connecting the caller's phone call to the processor, tracking incoming phone calls connected to the processor, recording the telephone numbers of the incoming telephone calls tracked in the tracking step, capturing and recording the user's telephone number and matching it with the telephone number of the incoming call that the user dialed, performing a database match utilizing the user's captured telephone number to obtain the user's name and address, recording the name and address of the user obtained from the matching step, allowing the user access to at least one of the prerecorded messages by pressing DTMF digits on the user's telephone, recording all DTMF digits pressed by the user and any other activity of the user while his phone call is connected to the processor, terminating the user's phone connection with the processor, and providing a data transmission immediately upon termination of the user's phone call to a third party containing the phone number dialed by the user, the user's own phone number, any DTMF digits pressed by the user or other events while his call was connected to the processor.

BRIEF DESCRIPTION OF THE DRAWINGS

For a complete understanding of the nature and desired objects of this invention, reference should be made to the following detailed description taken in connection with the accompanying drawings, wherein like reference numbers refer to corresponding items throughout the several illustrations of the preferred embodiments of the present invention and wherein:

FIG. 2B is a continuation of the flow diagram illustrated in FIG. 2A.

FIG. 2C is a further continuation of the flow diagram illustrated in FIG. 2A.

FIG. 3 is an example of an advertisement for real estate that can be utilized in connection with the present invention.

FIG. 4 is an exemplary advertisement for automobiles that would be used in connection with the present invention.

FIG. 5A illustrates a portion of the on-screen display for an exemplary DNI file.

FIG. 5B illustrates the on-screen display for an exemplary DTMF file.

FIG. 6 is an exemplary automobile sales lead that can be generated by the present invention.

FIG. 7 is an exemplary summary real estate lead that can be generated using the present invention.

FIG. 8 is an exemplary identification number status report in accordance with the present invention.

DETAILED DESCRIPTION OF THE INVENTION

The interactive method and apparatus for the generation of leads of the present invention is hereinafter referred to collectively as the interactive voice response or IVR system. In a preferred embodiment IVR system is designed to handle multiple simultaneous phone calls seeking recorded information concerning particular products or services and capture, track and record the phone number dialed by the caller, the caller's phone number and each message number entered by the caller via the telephone handset and each action prompted by something other than the message number entered and concerning the date and time, time and duration of the call. The IVR system then provides this data combined with other information obtained from matching the user's phone number to data in one or more databases to the prospective seller in the form of a fax, a printed document on a remote printer or a page occurs either during or immediately upon termination of the user's phone call.

Figure 1:
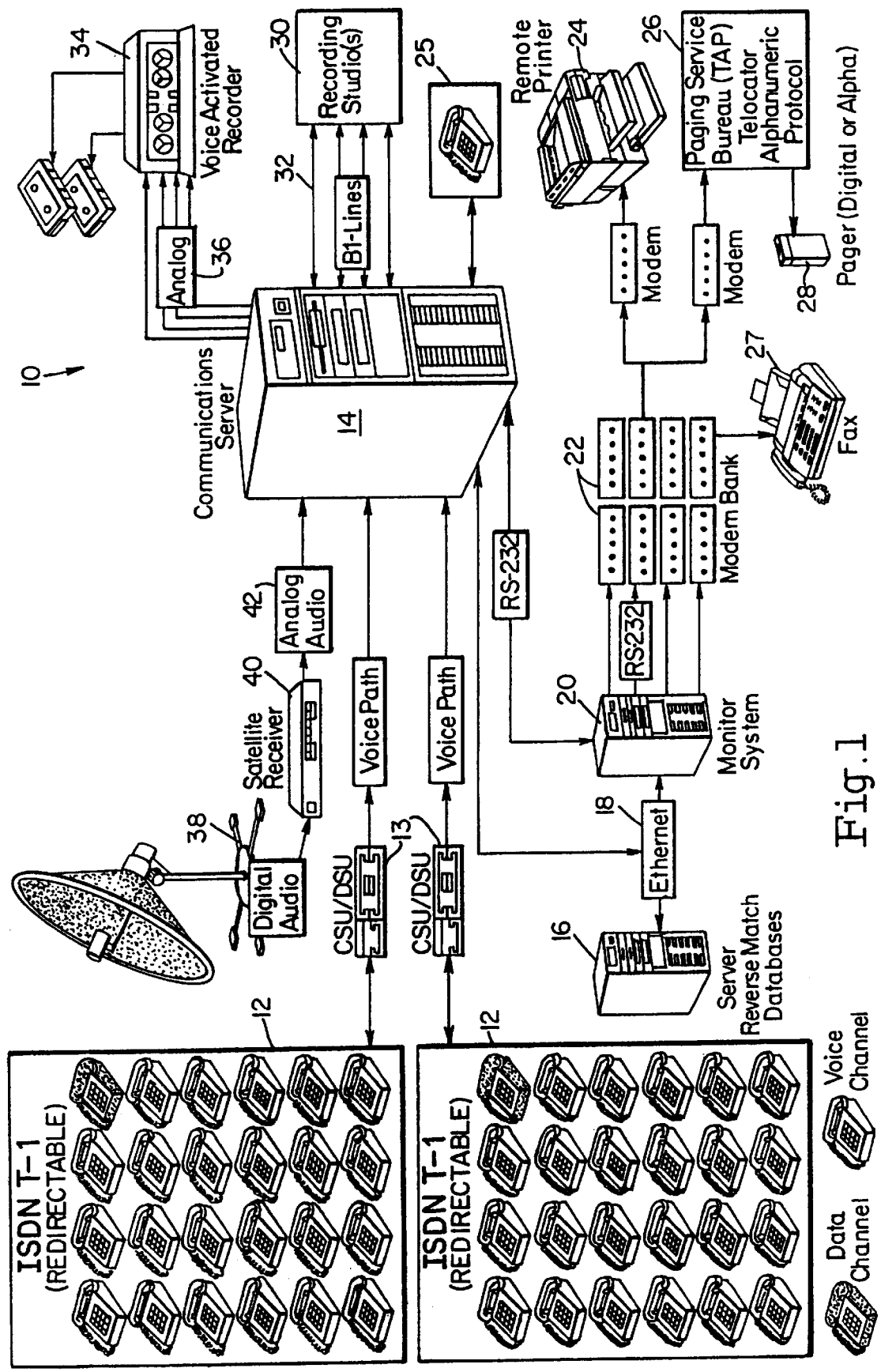
FIG. 1 is a schematic representation of one embodiment of the interactive apparatus and method for the generation of sales leads in accordance with the present invention.

Referring now to FIG. 1 of the drawings, the entire IVR system is schematically illustrated and referred to generally as 10. Two important components of the IVR system are the interactive voice response or IVR computer program contained in the main communication server 14 and the monitor program contained in the monitor system referred to as 20.

The IVR program operating in conjunction with certain computer and telecommunications hardware carries out most of the basic functions of the IVR system. The monitor program on the other hand is generally responsible for directing and distributing the information gained during the user's phone call in an immediate manner to sellers or other third party subscribers to the system. It should be understood that the exact details of applicant's method and apparatus as set forth herein are only non-limiting examples of a preferred embodiment for carrying out the invention. It should also be understood that a variety of substitutions could be made in terms of the hardware and software disclosed herein without departing from the spirit or scope of the invention.

A preferred hardware platform that can be used to facilitate the design of an embodiment the IVR system is an Intel 80486 processor or greater, Dialogic voice resource boards and Dianatel ISDN interface boards. Other hardware supported includes: Digi-Board RS-232, SMC 10-Base-T Ethernet, Adaptec 1540 SCSI controller, Dialogic SC/240 T-1 ISDN, Dialogic DTI-211 PBX interface, Dialogic D/40x analog interface boards, Lanier® voice activated recorders and Brite Voice Satellite Interface (analog audio).

The software of the preferred embodiment described herein was written in C++ using the Zortech's C++ compiler and Microsoft's macro assembler for low level assembler routines used in RS-232 communications and DOS critical error handling. The described embodiment of the IVR system uses Novell's Btrieve® technology for its data base interfaces or its equivalent. As can be readily appreciated by one of ordinary skill in the art, the code of the computer programs of the present invention could also be embedded in a plurality of semiconductor chips and this is also contemplated by the present invention.

Although the IVR system will be described below in connection with a preferred embodiment, namely, the generation of virtually instantaneous sales leads for large ticket items offered by subscribers to the system resulting from the user phone call, it is by no means limited to such uses. The IVR system can also be used to generate leads for the sale of a wide variety of other goods or services. Additionally, the ability of the system to conduct real-time polling potentially in connection with radio or television broadcast as will be described briefly later in this description.

Figure 2A:
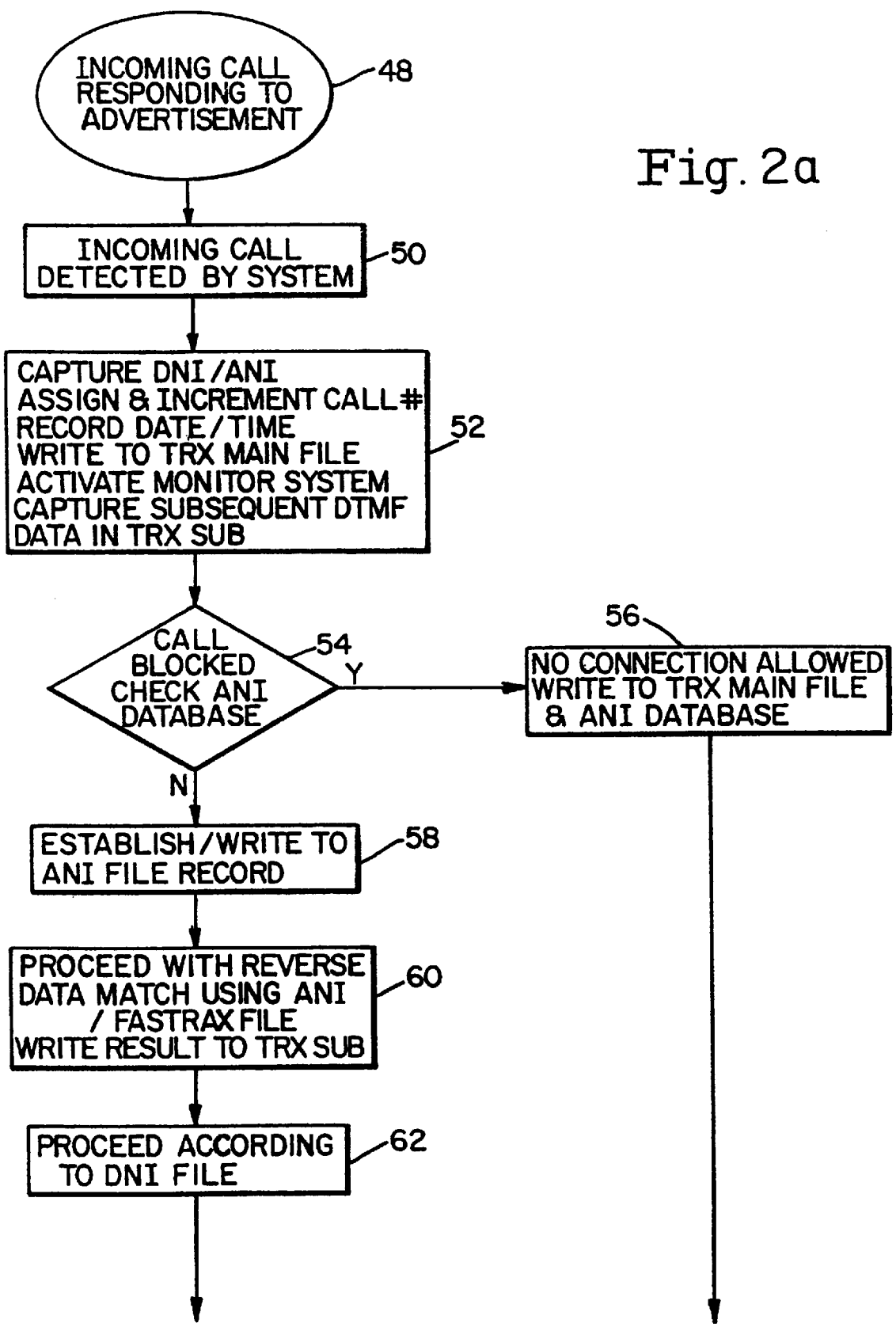
FIG. 2A is a portion of a flow diagram illustrating the basic progress of an incoming phone call in accordance with the present invention.

As set forth above and as illustrated in FIGS. 1 and 2A, the IVR system depends upon receiving multiple and at times simultaneous incoming telephone calls or a plurality of phone lines (T-1). In order to provide the system 10 with incoming telephone calls, it is necessary for the sellers or system subscribers to utilize the system in connection with advertising to generate these leads. These advertisements may take the form of print, broadcast, internet or other forms.

Subscribers to the IVR system, be they car dealerships, mortgage bankers, real estate agents or others, are assigned one or more incoming access telephone numbers supported by the system. The subscriber is then assigned a plurality of unique ID extension numbers for each of the phone numbers that they have been assigned. The ID extension numbers correspond to mailbox messages that are stored in the memory of the IVR system each containing information concerning a particular home or automobile, for example. The mailbox messages are designed by the subscriber and are preferably professionally prerecorded by an off site studio and inserted into the system. As will be described later in detail, the IVR system also permits real-time updating of the individual recorded mailbox messages as well as information access to the subscribers as to the date of the last update of each mailbox of that subscriber.

Turning now to FIG. 3, a typical real estate advertisement that would be used in conjunction with the IVR system is illustrated. The ad 43 lists the user access phone number 44 for that particular subscriber to enable callers to access the IVR system. In addition, each of the homes or properties advertised is provided with its own unique ID extension number 46 to enable the user to access further information contained in the corresponding mailbox once connected to the IVR system. In similar fashion the user access phone number 44 can also be listed on the realtor's sign located on the property itself, along with the appropriate ID extension number 46 for that property.

FIG. 4 illustrate a method of advertising that can be utilized with the IVR system to generate sales leads for automobiles. Just as in the real estate situation discussed above, the user access phone number 44 of the automobile dealer is prominently listed in the ad 45 with the instruction to enter the ID extension number 46 of the car of the prospective purchaser's choice. Each of the automobiles listed for sale is provided with its own unique ID extension number 46 that corresponds to the mailbox containing additional information for each particular vehicle in the IVR system. Alternatively, the user access phone number 44 and the ID extension number 46, could also be placed on stickers or signs that are located on the individual vehicles themselves. Using this method the user can acquire additional infomration and a lead to be generated without requiring further advertising, the dealership to be open, or a salesman to be available.

In other embodiments of the system, the ID extension numbers 46 could be used to identify particular categories of home and cars, for example, (e.g. grouped by price range or particular characteristics), rather than identifying a single home or automobile. In this manner a seller or subscriber can use the IVR system to identify and target potential consumer interest even for properties or items that are not particularly advertised with their own ID extension number. In such embodiments the ultimate lead generated may still be specific to a particular home or vehicle as a result of the caller's subsequent interaction with the system.

Before discussing in detail the sequence of events that are initiated in the IVR system by the incoming phone calls of users or prospective purchasers, it is important to first understand a few basics concerning the system. Dialed Number Identification Service (DNIS) drives the IVR system. This service immediately allows the IVR system 10 to determine the phone number that the user has dialed. The system further depends upon Automatic Number Identification (ANI) which allows the IVR system 10 upon reception of an incoming call in to immediately digitally identify the caller's phone number in a virtually error-free manner. This is in contrast to the less accurate caller ID that depends upon reading the tones associated with digits of the user's phone number. This of course permits a measurable increase in accuracy in identifying the user's own telephone number.

Since the IVR system is designed to handle multiple simultaneous incoming phone calls, its telephony interface is quite important to its operation. The IVR system 10 is therefore preferably designed with a telephony interface that supports two protocols "Double Wink" or "Robbed Bit" where the ANI and DNIS are in band DTMF digits and Integrated Services Digital Network (ISDN) where ANI and DNIS are out of band. There are obvious benefits to using out of band ISDN instead of Double Wink. The out of band data is transmitted at 56 kb on a dedicated channel whereas the in band data is a series of DTMF tones sent to the IVR system 10. The twenty digits resulting from the ANI (10) and DNI (10) take over four seconds to send in band, whereas the all digital ISDN takes a split second to transfer the same data. ISDN also offers other known enhanced features such as caller redirection (through MCI T-1) and variable rate billing (through AT&T 900 service) options.

Since the IVR system 10 depends upon incoming phone calls and was designed primarily for the (800) or toll free phone number market, caller control is mandated.

Because the user usually is not facing a charge on his telephone bill or elsewhere for time spent interacting with the IVR system 10, he is not likely to be very concerned about the amount of time he may spend tying up the system or one of its phone lines. The seller or subscriber on the other hand is usually facing such a charge for each incoming call often based on the duration of the call.

Additionally, the no charge aspect of the system 10 might also provide encouragement to unscrupulous competitors or prank callers to misuse or tie up the system. The subscriber on the other hand is desirous of constantly providing ready access to the information contained in the main server 14 and thereby generating leads with little or no waiting to as many different prospective purchasers as possible.

As a result the IVR system has a number of safeguards built in to address such concerns. Specifically, the system 10 is provided with a number of features to prohibit individual callers from either accidentally or intentionally tying up the system and its incoming phone lines to maximize the number of leads that can be generated for the seller or other subscriber. The details of many of these features will be addressed later in this detailed description.

With the above-listed basics in mind, the operation of the IVR system 10 will now be described with particular reference to FIGS. 1–2C by tracing the sequence of events that are initiated by a user or prospective purchaser calling one of the user access telephone numbers 44 listed in an advertisement such as previously described with reference to FIGS. 3–4. It should be understood that the call flow illustrated in FIGS. 2A–C is exemplary only. Referring now to FIG. 1, once a user dials a-user access telephone number 44 from an advertisement, the incoming phone line 12 is directed by a CSU/DSU 13 which sends the ANI and DNI associated with the call in ISDN directly to the main communications server 14. The IVR main program can then begin its operation.

Referring now to FIG. 2A, once a call responding to an advertisement is made this attempted access is detected by the system as indicated in boxes 48 and 50 respectively. The IVR system 10 then begins its activity to evaluate whether access will be permitted. As indicated in box 52, upon detection of an incoming phone call each individual call is assigned its own unique call number. The call number is incremented from the last call number assigned and is therefore never reused. This call number follows every extension entered by the caller as well as all events forced by the system and other actions associated with each call. The call number serves as a common identifier for all data captured associated with each particular phone call so that it can later be accessed or processed.

All digits entered by the caller and every event forced by the system are tracked through the TRX sub file. As indicated in box 52, upon inception of the phone call a record is written to the TRX main file, the main transaction tracking file for calls. The TRX Main file records the call number, the callers DNI and ANI, the date and time of the call. This information is referred to as the connect information and is ultimately copied to the disconnect information for the same incoming call once that event occurs. This permits a ready report of call direction and any calls that were abnormally terminated.

The two ISDN packets contained in the TRX Main record for each phone call (one for connect, one for disconnect), have many functions. This information is first used in the TRX Main file to track connections and disconnects of each incoming call. The ISDN packets are also used in the REQTRX file as a tracking method for seating of phone calls when a particular incoming number or extension are occupied or in rerouting the telephone calls as will be discussed later in detail. Thirdly, the TRX Main file is also used to communicate and forward information regarding incoming calls and the IVR system to the monitor system 20.

As further indicated in box 52, at this stage the monitor system 20 is activated every time a user connects, disconnects or enters DTMF digits the monitor system is listening to the transactions. The monitor system 20 is preferably connected to the main server 14 via an RS-232 port or similar configuration. When the monitor system 20 sees that a subscriber has further capabilities in their DNI or Broker file such as paging or off-line printing the monitor system will accumulate all information that is being assembled for a specific call number. On or before disconnect of the call the monitor system 20 will then engage in further action as will be discussed below and deliver the information the IVR system has accumulated in appropriate preselected form to the subscriber.

As further indicated in box 52, the IVR system 10 also prepares to capture subsequent dual-tone multi frequency (DTMF) signal activity of the caller in order to track all activity that a caller takes for this purpose. The TRX sub data file is used for this purpose. Every time the caller presses digits or is forced to another DTMF record a TRX sub record is written. The TRX sub file in combination with the TRX main file give a complete detail of the entire chronology of each call identified by call number.

For example, using the TRX sub file it can be shown that the caller first heard the greeting, then asked for an extension, then listened to the extension and after listening to the extension was rerouted to a given car dealer. The phone number of that car dealer is also contained in the record that indicates that the call was sent there. The end product is a complete audit trail of call processing.

Once the initial actions indicated in box 52 are completed the IVR system 10 is then already in possession of both the number, the caller dialed or DNI, as well as the caller's phone number or ANI. This information is collected and all of these actions occur prior to allowing connection of the call to the system. As previously indicated, caller control is preferable in the IVR system to screen out unscrupulous competitors, prank callers and those that-otherwise do not properly use the system from tying up the subscriber's phone line and extensions. This serves to maximize the number of leads that can be generated.

Box 54 illustrates the first of the elements in the IVR system 10 that assist in accomplishing this goal. In box 54 the ANI database is utilized to determine whether this caller is to be allowed into the IVR system 10 or is blocked from entering. The ANI database contains a list of all ANI's that have previously called the IVR system. A flag is added to any ANI on file that has previously abused or otherwise not properly used the system. If the caller's phone number is flagged or blocked in the ANI file, the caller is not allowed to enter the system and the call is terminated and the event is written to the TRX sub file as indicated in box 56. In this event a record is also written to the ANI file incrementing the number of times that this ANI has attempted to enter the system in total and also, if desired, over a given time period.

If in block 54 the ANI is not prohibited, the user is allowed to enter the system. In that case the ANI database is updated to track the caller's entry into the system. As long as the ANI is not blocked, the ANI database will monitor and store data indicating whether this is the first time that the ANI has called and, if so, the DNI number it came in on, the number of times that this phone number has entered the system, the number of calls per time period (e.g. month) that this ANI has made, the total elapsed time that this ANI is responsible for in total or over a given time period, as well as the date and time that this ANI first and last called the system. By capturing and storing this information, a very useful record of each caller's habits is attained for subsequent study and use by the seller or subscriber. The data is written to the ANT file record as indicated in block 58.

Once the ANI file is either established or updated in box 58 the call flow then moves on to block 60. In this block the IVR system 10 and the main server 14 interact with a server 16 containing reverse match databases through the Ethernet 18 or similar communications link as illustrated in FIG. 1. Referring back now to block 60 of FIG. 2, it is at this time that the IVR system 10 interacts with an on-line server 16, database or the like in order to utilize the ANI that it has already captured to obtain additional information concerning the caller. An example of a commercially available database that could be used for this purpose is sold by ProCD, Inc. under the name of SelectPhone. Once this additional information is obtained it is combined with the information already obtained regarding that call number. For example, the ANI is used as a starting point in block 60 to complete a reverse data match to obtain the name and address of the caller that is identified by the ANI. The IVR system 10 utilizes the Fastrax file in conjunction with the ANI database in order to accomplish this.

The Fastrax file is a simple file created for reverse matching in a batch format. The Fastrax file is used to send ten digit phone numbers (ANI) to the server 16 or a service bureau to accomplish the reverse data match. The Fastrax file works in conjunction with the previously mentioned ANI database which makes the decision to add the name and address record or not. When a call comes into the system, if the ANI is already in the ANI database, then the IVR system 10 is already in possession of the name and address associated with that ANI and nothing is done to the Fastrax file. If the ANI does not already exist, then the reverse data match is completed and a record is appended to the Fastrax file as well as the ANT database and the information is written to the TRX ma in call record for t hat particular phone call.

The reverse data match database can take the form of commercially available products such as telephone listing databases or can just as readily utilize an online data system. If the database utilized in the initial reverse match does not contain a name or address for the caller's ANT, then a secondary data match can be performed according to the area code and the first three digits of the ANI. This type of match provides information concerning the geographic area that the call is originating from and include this with the TRX main call record and the ANI file. As can be appreciated, additional or other data matches based on the ANI or other data could also be performed.

Although described here in a somewhat extended fashion, the actions of the IVR system 10 associated with blocks 52–60 take place virtually instantaneously and require only that an incoming call be received. As can be appreciated in referring to the call flow diagram illustrated in FIG. 2, once the incoming caller has made a connection with the IVR system 10, the system is immediately in possession of the number they called (DNI), the caller's own phone number (ANI), the date and time of day that the caller telephoned and any relevant reverse database match information including the caller's name and address, even if the caller subsequently hangs up or is forced into a disconnect situation through their own action or an error prior to further progressing through the IVR system or listening to any of the recorded messages.

As previously mentioned, dialed number identification service drives the IVR system. Since there are really only two pieces of data that come in with the phone call (ANI, DNI) that DNI is used as a starting point for all calls. Based on the number dialed by the caller the caller may have different options and choices available to them. The DNI data base is used to provide information to process calls in accordance with specific DNI files in the system associated with each dialed phone number. Once the reverse data matching based upon the ANI is completed in box 60 the phone call continues to proceed according to the DNI file as indicated in box 62. A summary of a portion of an exemplary DNI file is illustrated in FIG. 6A and generally referred to as 63.

As illustrated, the DNI file assigns a group and station number to each DNI so that the subscribers to the IVR system can assign a number of different DNI's to a given group number. In this manner, if the subscriber has a number of different DNIs for his properties or items, then he can either look at reports based upon the individual DNIs or upon the entire group. Similarly, the station entry can be used to categorize reports for a given individual or individuals within the subscriber's organization.

The DNI file also provides the next level of control over incoming call flow to maximize use of the IVR system 10. For example, the DNI file is used to define the maximum number of messages and maximum call duration for each DNI. In addition, it sets the number of DTMF digits that are utilized for subsequent action and/or call termination. It also sets the number of replays allowed of messages, the maximum time allowed to record voice messages (if this function is permitted), the number of seconds to wait for DTMF input and the forced logic structure of the DNI file which will operate when incomplete or improper inputs are entered.

The DNI database also tracks the number of calls coming into the DNI per month or other time period and also the elapsed time and number of callers to a specific DNI per month or other time period. The DNI file further determines the sequence of the call if forced logic events or call terminations are called for. The DNI file is also used to determine if and where rerouting of the call of the DNI file is permitted and the rate code to be applied to incoming calls for billing purposes. In addition, the DNI identifies whether there is a sponsor of the particular DNI and record and report how many people have listened to the sponsored message as well as the sponsorship ad.

The DNI file may in certain circumstances call for the voice prompt files of the IVR system 10. For example, if Dialogic voice resource or similar boards are used in the system can play a prompted voice file. These files have an array of offsets and links for each prompt in the file. Up to 3,000 prompts are supported per file. The purpose of these files is to automate playback of multiple prompts within one file. When a prompted play is requested, the device driver is passed the array of prompts to play.

As the call proceeds according to the DNI file in block 62 the IVR system checks to see whether a sponsor message is present in block 64. If such a message is present the message is played from the sponsorship database as indicated in block 66. The call flow will then continue to proceed according to the DNI file. The same is true if there is no sponsor message.

It is at this stage that the IVR system will now allow the caller to access and listen to the recorded mailboxes that contain home or auto information that corresponds to the unique ID extension numbers 46 previously described and illustrated in connection with FIGS. 3 and 4. Once the user is prompted (box 67) and has input the ID extension (box 68) of a given property or automobile, for example, the IVR system continues during the course of the call to add the DTMF digits entered, the date and time they pressed the digits, the date and time that they were finished with the specific function and the group and station to the TRX sub record of that call number. Due to the unique structure of the IVR system, more than one and potentially all incoming callers can listen to the same message at the same time.

As in the situation of the TRX Main file to speed up the writing of these records to the TRX sub file they are not in a database format. All records are simply appended to the end of the transaction file for the fastest possible write. To virtually eliminate any chance of losing transactions all records are hard flushed to disk guaranteeing that data is written to the hard drive and still not in the disk buffer. This process virtually eliminates the potential for data loss should the system be interrupted by a power surge or loss.

The information in the TRX sub file for a given call number is again combined with the information in the TRX Main file and monitored by the monitor system for potential subsequent action. The TRX sub data file is used to track all activity that a caller takes. Every time he presses digits or is forced to another DTMF record, a TRX sub record is written. For example, using the TRX sub file you could show that a caller first heard the greeting, then was asked for an extension, then listened to that extension and after listening to the extension he requested another extension or was rerouted to the broker's office. Between the information contained in the TRX main and TRX sub files a complete audit trail of each incoming call listed by call number is available.

Once the user is in the IVR system 10 the DTMF file for the particular ID number entered defines what occurs when a caller inputs DTMF digits or when the call is forced to other extensions without user input. The files are indexed by DTMFs and group and station as previously described in connection with the DNI file. Using these three data elements the same extensions entered on different DNIs can be entered on different DNIs and perform different functions. For example, ID number or extension 3000 for DNI (800) 123-4567 can be about a $300,000 house, however on a different DNI (800) 987-6543 the same extension number might be used for a $50,000 house.

FIG. 6B illustrates an exemplary DTMF file record generally referred to as 55. Similar to the previously described DNI file, the DTMF file establishes certain actions allowed by the caller including possible access by the subscriber to data concerning the DTMF file. In addition, it also sets the appropriate mailbox message to be played, the maximum number of replays and record time and maximum number of invalid DTMFs before termination. It sets the forced logic for situations where the caller did not enter any DTMF digits or incomplete or erroneous DTMF digits, determines termination and hang up criteria and procedures and sets the rate code and sponsorship of the data base for billing and reporting purposes. The DTMF file also determines whether voice recording of messages are permitted, identifies the broker number and writes this information to the TRX sub file to enable subsequent break down by broker of calls or inquiries received.

The DTMF file also records the number of times that the mailbox messages have been recorded and the date of the last update. This information can then be accessed by the subscriber or the owner of the IVR system. The DTMF file appropriately modifies this information every time a message is recorded or updated as will be described in more detail to follow. As will be explained in more detail below, updating of the recorded messages occurs in milliseconds. The IVR system is further desigend so that these updates occur only when no one is playing or accessing the DTMF file.

Returning to the call flow diagram of FIG. 3, once the unique ID number extension is entered by the user in block 68 the mailbox recording for that extension is then played in block 70. As set forth above a record of all events concerning the playing of the recording associated with the ID number extension is written to the TRX sub file and management of replays, additional digits entered, etc . . . , is handled in accordance to the DTMF file.

Moving to block 72 the IVR system 10 also gives the ability for the caller when permitted by the DTMF or DNI files to record messages on the IVR system. All recorded audio is stored on the computer's hard drive. Once the voice recording is finished, if the DTMF file 30 so indicates, the audio is sent via an analog interface to a voice activated recorder. Otherwise, the recorded audio will remain in the system as an audio file that could be played back at a later time. The transfer of audio to a voice activated recorder is illustrated schematically in FIG. 1 as a voice activated recorder 34 connected by an analog interface 36 to the main server 14. Although illustrated as occuring after a mailbox message has been accessed, this function can be provided for at other times during the call flow.

Once the audio is on the line the recorder 34 starts to record and once there is silence again it stops. When the call is sent to the recorder 34 additional information that the caller never voiced is also sent before the actual recorded message. The information and notification that a voice message was left includes at least the date and time of the call, calling phone number and a reason why the caller left their name and address. This information is written to the TRX sub file for the particular call number as indicated in box 74.

Another option provided by the IVR system is call rerouting as indicated in box 76 in FIG. 2 and schematically illustrated in FIG. 1 as the main server 14 transferring an incoming call to a third party phone indicated generally as 25. The call redirection function of the IVR system 10 utilizes the call routing database and can be utilized in many different ways. For example it could be used to reroute the phone call to the sponsor of the DNI, particular brokers or agents, car dealerships, or to the branch of a real estate office closest to the caller's home utilizing the already captured ANI and reverse match address information.

Caller redirection is accomplished by searching for the full ten digit ANI and the sponsor code of the specific mailbox message. If this is not found the first six digits of the ANI and the sponsor are looked for. If still unsuccessful the area code plus the sponsor are looked for. If this fails the reroute field in the DTMF record is used. If any of the first three options are found in the call routing database the reroute data is used to send the call to the specific location identified. The call redirection option can be provided whenever it is desired in the call flow.

The call redirection and routing feature was designed to be particularly useful for routing calls to businesses using the IVR system that have multiple locations or stores. For example, if a retail store, restaurant chain or real estate agency has 500 locations, with the use of this database the IVR system can put the caller in immediate communication with the branch closest to their calling area. Box 78 indicates a call that has been rerouted or redirected to the telephone company or other number. If for any reason the number that the rerouting is requesting is unavailable the IVR system allows the caller to return to the system with an appropriate message indicating this and presenting further options.

Continuing with the call flow in FIG. 2B the caller has previously recorded a message (box 74) or attempted unsuccessfully to be transferred to another number (box 78) the caller is still in the system continuing to be directed by the DTMF file. Unless previously terminated the caller is prompted for another event such as listening to another mailbox message corresponding to a different ID extension number or a replay of a previous message as indicated in box 80. Such a request is evaluated in accordance with the history of that call found in the TRX main and TRX sub riles measured against the DNI and DTMF file parameters for that particular number to determine whether the request will be permitted. If the request is permitted the call is returned to the appropriate place in the call flow. If not permitted the call flow continues to box 82 as will be described below.

As briefly mentioned above, the IVR system utilizes a form of forced logic to further maintain caller control and maximize effectiveness of caller access and flow. The IVR-system therefore provides a number of forced events that are directed by the system in general or the DNI and DTMF files. The term "forced events" is used to refer to situations where action is taken by the system that is not either fully, or in some cases even partially, resulting from actions taken by the caller. At one level, these forced events direct system activity when for example a user does not enter any DTMF digits or enters erroneous or incomplete digits. Other examples of activity that might prompt a system forced event are recognition that the call has reached its maximum total allowed time or that the caller has accessed the maximum number of allowed mailbox recordings for a particular DNI.

It should readily be recognized, therefore, that the actions or inactions of a caller could occur essentially anywhere in the call flow. For this reason the forced event is generally depicted in the exemplary call flow illustrated in FIGS. 2A–C, (box 85) connected to virtually all segments of the process. In operation, if caller activity or inactivity prompts a forced event the system will either move the caller to the appropriate location in the call flow or terminate the call. Depending upon the particular forced event the system may play an appropriate message notifying the caller of the action to be taken or warning of the impending activity and requesting further caller input. As can be appreciated by one of ordinary skill in the art, the forced logic built into the IVR system further maximizes the effectiveness of the system and the generation of leads and provides a further safeguard against misuse of the system.

Ultimately, as a result of either a caller request, a forced event (e.g. maximum call duration, or maximum number of allowed mailbox ID recordings played or a hang up) the call is terminated as indicated in box 82. If termination was the result of an event other than a hangup the system plays an appropriate notification message for the caller. Upon termination the time of the call disconnect is recorded and combined with the prior connect information for that call number in the TRX Main file. In addition, any action the caller took or a forced event that precipitated the disconnect is written to the TRX sub file under the appropriate call number as indicated in box 84. At this stage of the call flow the sales lead has been completely assembled and stored. This leaves only the communication of the desired elements of the lead to the subscriber to occur via the monitor system 20.

As previously described, the monitor system 20 is connected to the main communications server 14. The monitor system 20 in turn is also connected via RS-232 ports to a bank of modems 22. The monitor system 20 may also be connected by the Ethernet 18 to the reverse match database server 16 as illustrated in FIG. 1. As previously indicated the TRX Main file is used to communicate with the monitor system 20 and give information about the IVR system 10. The monitor system 20 has been listening to the connect, entry of DTMF digits, all other events and the disconnect of each call where it is indicated in the DNI file that subsequent monitor system 20 activity is desired.

When the monitor system 20 sees that a subscriber has these capabilities it accumulates all of the packets from the TRX Main and TRX sub file for the specific call number. Upon call disconnect the monitor system 20 then operates in accordance with the DNI and/or DTMF file and decides which action to take including where and how to send the accumulated information.

For example, the monitor system 20 may immediately fax the lead information to the seller as indicated in box 88. Alternatively it may page the seller and deliver all or part of the information in the page itself as indicated in box 90. The monitor system 20 may instead send the data to an off-line printer at the subscriber's for immediate printing of the lead information. Alternatively, the system 20 may fax, page or send to an off-line printer at a predesignated time or periodic interval as indicated in box 94. The actions are illustrated schematically at reference numbers 24, 26, 27 and 28 in FIG. 1.

As a result of the monitor system action the seller or other subscriber to the IVR system is provided with a complete sales lead at their place of business immediately upon termination of the telephone call or beginning even prior to call termination if so desired. Equally as important as the speed of delivery of the lead to the subscriber is the content of the lead includes the prospects phone number, their name, address, (city, state and zip code), item(s) of interests) (e.g. particular properties, automobiles, or types or categories of same), the amount of time they spent listening to the overall information, the amount of time they spent listening to information about each particular item(s) and whether they listened to any of the recordings more than once, among other information set forth previously. Likewise, having this additional information including the name and address of the caller allows subsequent sales approaches to be personalized and wrong numbers and competitors or prank callers to be quickly screened out and if necessary prevented in the future.

In addition to generating the lead, the date and time of day, as well as the unique ID extension number provides the IVR system with a very efficient mechanism for tracking the effectiveness of ads placed by the subscribers containing the access phone and ID numbers. If call volume increases after certain broadcast or print ads, or if certain unique caller ID numbers are only used in one place or form of advertising, subscribers can better evaluate past and future spending their limited marketing dollars in order to maximize the return from such expenditures.

FIG. 6 illustrates a typical print out from an off-line printer located at a subscribers place of business that might appear immediately upon termination of a phone call at an automobile dealer. As illustrated, the lead 97 provides the lead or call number 98, the number dialed 100 by the caller and the name of the subscriber 102. The lead 97 further indicates the call duration 104, the date 106 and the connect time 108 of the phone call. The lead 97 then further provides the callers name, address and telephone number (ANI) 110, 112 and 114 respectively. The lead then indicates the ID number(s) entered by the caller 116. Although a variety of remote printers can be used in connection with the IVR system 10 it has been found that use of a commercially available printers such as those manufactured by Star Micronics or Epson America that provide multiple copies of the lead in a single print have been effective.

Another example of the potential output of the IVR system is illustrated in FIG. 7. This example illustrates a call activity report for a given period of time that summarizes the activity with respect to one of the assigned dialed numbers (DNI) of a real estate broker. The summary 117 provides a report of four separate leads 118, 120, 122 and 124 respectively and details the activities of these callers in the IVR system. The DNI 119 and broker number 121 appears at the top of the summary. The data for each of the individual leads 118, 120, 122 and 124 respectively can of course be provided immediately after termination of the original phone calls in any of the previously mentioned methods. In addition to the telephone numbers of the callers or ANIs 115 and ID numbers 111 of the mailboxes accessed by the callers a detail is provided on the duration of the total call 125 and the duration or length of time that each of the selected ID extension numbers was listened to by the caller (123). The illustrated summary 117 contains a lead 118 that has gone through a secondary data match as previously described. In this situation, no direct name and address match was found for the captured ANI so a secondary reverse data match was performed using the area code and first three digits of the phone number to obtain the regional area that the call originated from.

During operation of the IVR system 10 all system errors are logged to an error file. These errors include DOS errors, hardware errors, critical errors and warnings. Other messages are also written for debugging purposes. This file is a text file that can easily be read with any commercially available text editor. It is flushed to the hard drive based on a time set in the system constant file. All error messages are also outputted to the error window on the system screen. It is possible to log all or certain types of errors to cause a page to be made to the pager of someone maintaining the IVR system as indicated in block 96 of FIG. 3.

Returning to FIG. 1, some of the other features of the IVR system will now be discussed. The system 10 also enables satellite downloading of audio or voice files. As indicated, using a receiver 38 and a converter 40 digital audio can be received and converted into an analog audio signal 42 that is directly inputted into the main communications server 14. Via this analog interface with the satellite receiver 38 the system 10 is programmed to take audio from a satellite and update the voice files in the system. This enables the provision of recorded broadcast audio, for example, to be stored and played back using the system.

The BDR database is used to take downloads from a satellite, record the downloads to a specific audio file and then convert that over to a system specific recorded voice message. The satellite downloader receives a certain number of DTMF digits before each recording. These digits are received by the downloader on an analog channel 42 of the system 10. The system then takes specified digits and looks into the BDR database to decide what file name to record to. Once it is recorded it is prepared to update the system as soon as possible. Updating is done virtually instantaneously while no one is listening to the recording. This feature enables the IVR system 10 to feature up to the minute news, weather and sports, for example, on a given channel or to be used as part of the specific call process or for callers that may temporarily be on hold.

Yet another feature of the IVR system 10 is audio uploading from remote sites. As illustrated in FIG. 1, this gives the system 10 the capacity to update specific recordings identified by the given ID numbers that have been professionally recorded and edited by a remote recording studio 30 and transmitted via analog phone lines 32 into the main communications server 14. The insertion of these recordings does not interrupt the system and provides significantly higher quality recordings than prior subscriber recorded message systems. The system utilizes the uploader transaction file to track all uploaded files from remote sources. The uploader channels are set up to accept audio input from external sources while the system is still operating.

The audio uploader works similar to the satellite downloader. To achieve audio uploading a series of 12 DTMF tone are sent from a recording studio to specific audio uploader analog channels. These DTMF tones can represent, for example in a real estate situation, the bank number, the broker number and the recording ID number. In this manner, when a recording is uploaded it goes to the DTMF file and seeks an exact matching record to be updated. These codes are sent to the system in simple DTMF tones.

When the system sees all of these digits it looks up in the DTMF database to see if there is already a DTMF record for the recording number. If the record exists, it simply copies the broker number and other updated information and replaces the broker number already in the DTMF record with it. If there is not a record it then looks at the DTMF file for a special call record called the skeleton record. The skeleton record defines how a typical recording for this specific station and group is to be set up. If it does find a match for the specific station and group, the system record for group "0000" and station "0000" is used. The uploader file updates files virtually instantaneously and it only does so when the recording is not being listened to. If the recording that is the subject of the update is in use, the update is held until that recorded message is free.

Yet another application of the IVR system as a PBX interface. The system can communicate with most PBX systems using a physical interface to the PBX via either a Dialogic DTI-211 or a Dianatel EA24 in robbed bit mode. This is a two function application. First it can be used as a protocol converter. The call can come into the system using ISDN protocol and have all the function of ISDN and then convert the cross connect channel into Robbed Bit. The benefit of this is that most PBX systems support Robbed Bit, but few support it in ISDN interface. Secondly, the PBX interface can be used to place calls to specific PBX extensions in a call center.

The IVR system further permits subscribers to the system such as brokers or car dealers to access summary information concerning their user access phone number(s) 44 as well as their particular unique user access ID numbers 46 corresponding to their recorded mailbox messages associated with those phone number(s). For example, the subscriber can via a standard telephone connection or internet access the main communications server 14. Once the subscriber meets the security screening tests of the IVR system they can then access the vast amounts of data accumulated and stored for their phone number(s) and extensions in the system. Internet access for end users to receive real time call activity can also be provided.

The system can be adapted to provide this information in varying formats such as voice communication, online access, fax or a printed document on a subscriber's remote printer. FIG. 8 illustrates an example of such data wherein the subscriber has been provided with a printout of the last date that each of the ID numbers associated with the particular user access telephone numbers were updated by the uploader files. Some examples of additional information that might be provided include monthly call activity or duration or tracking of incoming calls by time of day or date.

The foregoing description of one embodiment of the IVR system is intended to be exemplary only of two potential uses of the system. As previously mentioned, the system could be equally beneficial in generating leads for a variety of different goods or services. Although described in connection with the detection of DTMF digits, the system could instead be based on voice recognition. In addition, the system also lends itself to conducting real time polling such as in response to a television or radio survey.

In this situation, the incoming phone calls would represent those registering their opinion, rather than those seeking further information on goods or services. Nonetheless, the same capture of the user's phone number and reverse data match to provide the caller's name and address information in the survey results. The callers would be directed to enter ID numbers that represent their particular preference, which would then be recorded by the IVR system as previously described. As the survey results are entered they could be communicated via a monitor system, by printing or an online computer tally of the survey results as they occur on a real time basis. Obviously this survey function of the IVR system could also readily be combined with the lead generation functions of the system.

What is claimed is:

1. A user interactive method for conducting polling comprising the steps of:

storing a plurality of recorded messages in a memory accessed through a processor;

receiving incoming telephone calls of users seeking access to certain of said messages stored in said memory;

connecting said incoming telephone calls to said processor;

capturing phone numbers of the users associated with said incoming telephone calls received in said receiving step;

recording in said memory data which includes DTMF digits entered by the users and the time of the telephone call and a response by said processor associated with said incoming telephone calls while the incoming telephone calls are connected to said processor;

disconnecting said incoming telephone calls from the processor; and transmitting the recorded data from said memory to a third party automatically at a preselected time concerning the disconnected incoming telephone calls, said data containing the phone number of the user, said DTMF digits entered by the users, the time of the telephone call, and any response by said processor while said telephone calls were connected thereto.

2. A user interactive method of polling comprising the steps of:

storing a plurality of recorded messages in a memory accessed through a processor;

receiving incoming telephone calls of users seeking to access certain of said messages stored in said memory;

connecting said incoming telephone calls to the processor;

recording in said memory data which includes DTMF digits entered by the users and a response by said processor associated with each of said incoming telephone calls while the incoming telephone calls are connected to said processor;

disconnecting said incoming telephone calls from the processors; and transmitting the recorded data from said memory to a third party including said DTMF digits entered by the users automatically at a preselected time.

3. A user interactive method for the generation of leads comprising the steps of:

storing a plurality of recorded messages in a memory;

connecting incoming phone calls to a processor and recording the date and time of day of the incoming phone calls;

recording the telephone numbers of the incoming phone calls;

allowing the user access to at least one of said prerecorded messages by pressing DTMF digits on a telephone;

recording data which includes DTMF digits pressed by the user while the incoming phone call is connected to the processor;

terminating the user's phone connection with the processors; and providing a lead in the form of a data transmission to a third party containing the user's telephone number, duration of the incoming phone call and the recorded data.

4. A user interactive apparatus for the generation of leads comprising:

a processor;

a memory;

means for storing a plurality of recorded messages corresponding to particular products in said memory that can be accessed through said processor;

means for receiving incoming telephone calls of users seeking to access certain of said messages stored in said memory;

means for connecting said incoming telephone calls to the processor;

means for determining the phone numbers dialed by said incoming calls received by said receiving means and recording said phone numbers dialed in said memory;

means for capturing the phone numbers of the users associated with said incoming telephone calls received by said receiving means;

means for matching said phone numbers of the users captured by said capturing means with said phone numbers dialed for said incoming telephone calls and storing them together in said memory;

means for selectively permitting said incoming phone calls to access certain of said messages stored in said memory;

means for disconnecting said incoming phone calls from said processor; and means for automatically transmitting data from said memory to a third party at a preselected time concerning said disconnected incoming telephone calls, said data containing the phone number dialed by the user and the phone number of the user.

5. A user interactive method for conducting polling comprising the steps of:

storing a plurality of recorded messages, each of said messages in a memory accessed through a processor;

receiving incoming communications of users seeking to access certain of said messages stored in said memory;

connecting said incoming communications to the processor;

capturing information sufficient to identify the source of the users associated with said incoming communications received in said receiving step;

permitting said incoming communications to access certain of said messages stored in said memory;

recording in said memory data which includes, input entered by the users and the time of each incoming communication, and a response by said processor while the incoming communications are connected to said processor;

disconnecting said incoming communications from the processor; and transmitting the recorded data from said memory to a third party automatically at a preselected time concerning each of said disconnected communications, said data containing the information captured in said capturing step, and said input entered by the users.

* * * * *